141-392 SR
4/7/87 OR H 000,252

United States Statutory Invention Registration [19]

[11] Reg. Number: H252

Sturman [43] Published: Apr. 7, 1987

[54] FILLING NEEDLE HOLDER ASSEMBLY

[76] Inventor: Edgar J. Sturman, 708 Southern Dr., West Chester, Pa. 19380

[21] Appl. No.: 902,913

[22] Filed: Sep. 2, 1986

[51] Int. Cl.[4] ..... B65B 1/04

[52] U.S. Cl. ..... 141/392

*Primary Examiner*—Stephen C. Buczinski
*Assistant Examiner*—Linda J. Wallace

[57] ABSTRACT

This invention provides a filling needle holder assembly for use in automatic container filling machines which comprises an integral hub section, collar and shaft; a non-integral hub section, and filling needle restricting means at the needle nozzle end of the shaft, said integral and non-integral hub sections constituting clamp means for securing said holder to a filling needle disposed in a longitudinally drilled hole through said shaft, collar and hub.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

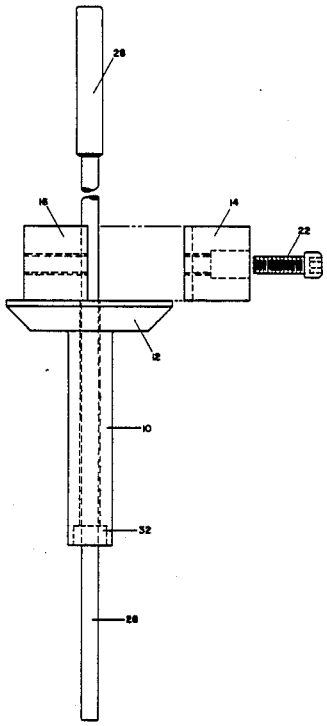

FILLING NEEDLE HOLDER ASSEMBLY

BACKGROUND OF THE INVENTION

Various types of automatic container filling machines are employed in industry to transfer bulk liquid to individual containers such as bottles, vials, ampoules, and disposable cartridges. In the pharmaceutical industry, the practice of filling small containers with a unit dose of a parenteral drug formulation for ease in dispensing, may also involve the step of flushing the containers with an inert gas, typically nitrogen, immediately prior to filling (U.S. Pat. No. 3,670,786). In either situation, whether conveying a gas or a liquid to the small container, the conduit attached to the automatic filling apparatus commonly referred to as the fill needle, is synchronized with the container feed assembly in such manner that either the needle or the individual containers reciprocate vertically so that the liquid fill or gas flush is initially introduced at the bottom of the container and completed on the reverse stroke.

The hollow fill needle is sometimes broken or bent during the verticle reciprocation stage, when it strikes the lip of an improperly seated container. Under normal usage, the front edge of the needle gradually becomes worn and burred from contact with the containers being filled. Repair of the needle requires removal of material securing the needle to the apparatus holder. Conventionally silver solder is applied at the back ends of the needle holder and at the point the needle nozzle extends from the holder at the front, to restrict bending or movement. The apparatus fitting or holder is then polished and reassembled with a new needle and the entire assembly is sterilized prior to reinsertion in the filling apparatus. Even where the used needle can be refitted in the apparatus fitting, each needle can be used at most 2 or 3 times before it is too short to properly fill the containers. Usually a needle is used once and discarded.

DESCRIPTION OF THE INVENTION

In accordance with this invention, there is provided a new filling needle-holder assembly which does not require the use of permanent securing means to maintain the needle in proper position in the holder.

DESCRIPTION OF PREFERRED EMBODIMENTS

Figure 1:
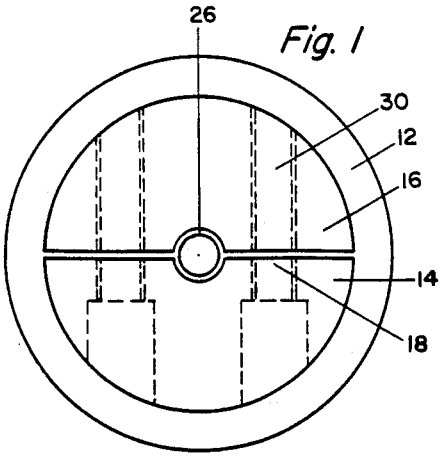
FIG. 1 is a top view of the needle holder.
Figure 2:
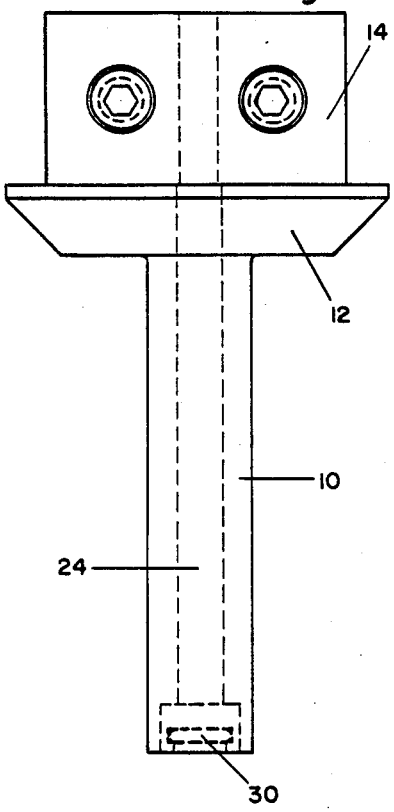
FIG. 2 is a side view of the needle holder with a center sectional view of the needle holder shaft at the needle nozzle end.
Figure 3:
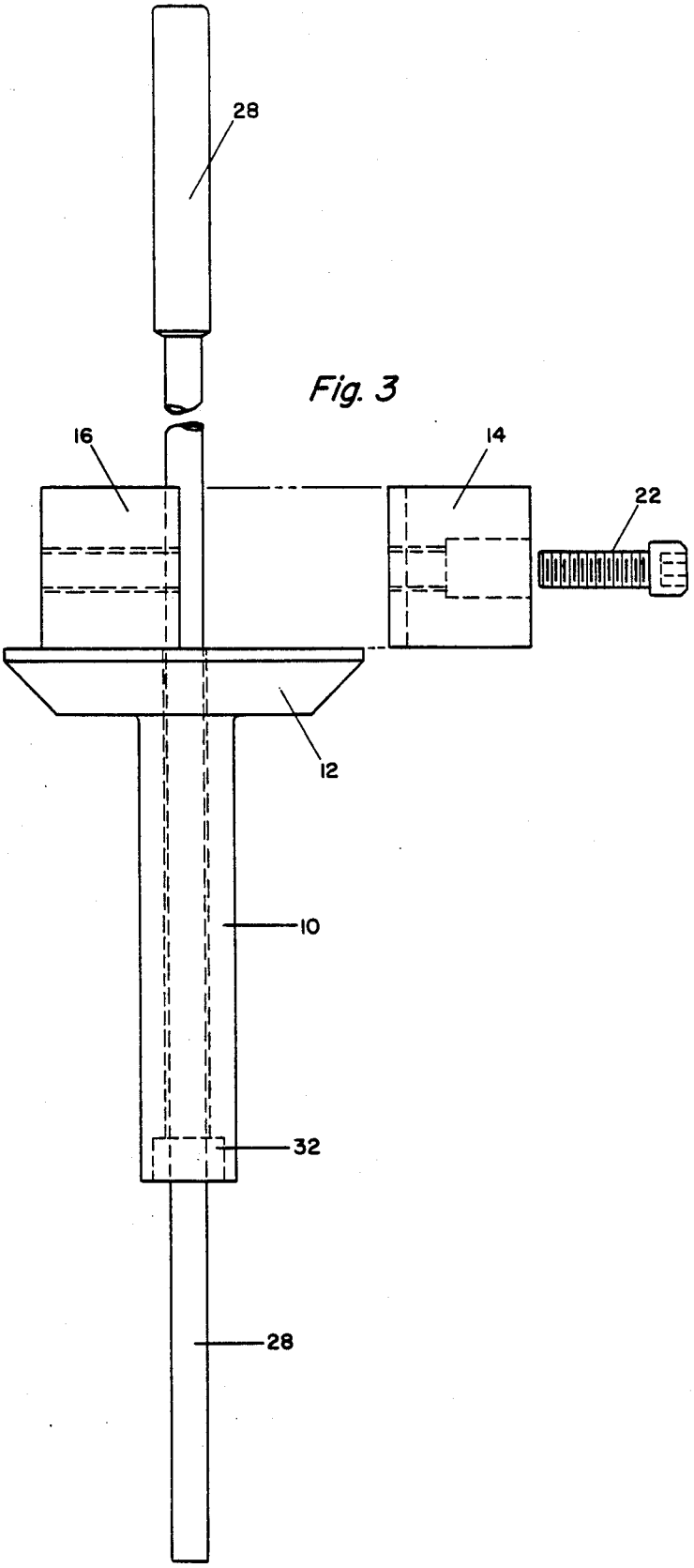
FIG. 3 is an exploded side view taken at a 90 degree angle from the view of FIG. 2 to illustrate the needle holder clamp device.

With reference to the drawings, the fill needle holder consists of a hollow shaft 10 integral with collar 12 and one of hub clamp sections 14 and 16. One of hub clamp sections 14 and 16 is a non-integral clamping piece. Hub clamp sections 14 and 16 are drilled 18 and tapped 20 to receive inset bolts 22. The fill needle holder is center drilled longitudinally to receive a tubular fill needle. At the split sectional hub clamp the longitudinal hole to receive the fill needle is of a smaller diameter than the longitudinal hole extending through shaft 10 and collar 12 and smaller than the diameter of the needle so that securing bolts 22 exert pressure on the needle, effectively clamping it to the needle holder hub sections 14 and 16. At the bottom of shaft 10, means are provided to restrict movement of the needle as it exits the holder shaft. In FIG. 2 the restriction means in shaft 10 is depicted as an O-ring 30. In FIG. 3, the preferred restricting means in shaft 10 is depicted as a bushing 32. The clearance between the needle and bushing 32 is about 5 thousandths (0.005") inches, whereas when a flexible O-ring 30 is employed, a tight surface-to-surface contact results which prevents any back flushing of material into hollow shaft 10.

The needle holder of this invention permits rapid removal of a worn, bent or broken needle. The damaged needle nozzle can readily be removed with a tube cutter, the needle orifice standardized with a reamer and the repaired needle resecured in the holder by moving the holder away from the needle nozzle. Usually a loss of about one eighth inch of needle tip results from each refurbishing operation. Thus, the fill needle may be easily used eight to ten times before discarding. The economy of time and materials attending the use of the needle holder of this invention, which permits simplified fill needle repair, is substantial.

In actual practice, the fill needle holder of this invention was constructed of 316 Stainless Steel LC (low carbon) equipped with two Allen Head bolts for the hub clamp and a 316 Stainless Steel LC bushing 0.160 internal diameter at the needle exit end of the shaft. The hub of the holder was completed by spacing the clamp 0.30 inches and drilling a centered 0.150 inch verticle hole. The hole through the shaft and collar were 11/64 inch in diameter. The fill needle is 0.155 inches in diameter. Upon installation, the fill needle is fitted through the bushing, leaving about 0.005 inches free play and securely clamped with the hub clamp, to leave about 3.25 inches fill needle exposed beyond the holder shaft. The fill needle is about 16 inches in length and made of 316 Stainless Steel LC. The entire assembly is then secured to an Arenco Filling Machine with an internally beveled, threaded collar nut and the machine operated in normal fashion.

What is claimed is:

1. A filling machine needle holder comprising: (a) an integral hub section, collar and shaft, (b) a non-integral hub section, and (c) fill needle restricting means disposed at the needle nozzle end of said shaft; said integral hub section and said non-integral hub section being drilled and tapped to receive plural bolt means; said hub sections, collar and shaft defining the circumference of an internal channel of non-uniform diameter in which a fill needle may be detachably secured by said hub sections and said restricting means.

* * * * *